United States Patent
Vilhena da Maia de Sá E Menezes et al.

(10) Patent No.: US 11,947,445 B2
(45) Date of Patent: Apr. 2, 2024

(54) ADJUSTMENT OF OPERATING PARAMETERS OF ARRANGED SOFTWARE ASSETS

(71) Applicant: MCKINSEY & COMPANY, INC., New York, NY (US)

(72) Inventors: Pedro Miguel Vilhena da Maia de Sá E Menezes, Rio de Janeiro (BR); Andreas Raggl, Schindellegi (CH); Ryan Edward Luque Maas, Mountlake Terrace, WA (US); Andreas Kremer, Berlin (DE); Frank Rainer Alfons Herbert Gerhard, Zwiefalten-Gauingen (DE); Pankaj Kumar, New York, NY (US); Marie-Paule Laurent, New York, NY (US); Michelle Atwood, New York, NY (US); Justin Lee Gibbs, San Jose, CA (US)

(73) Assignee: MCKINSEY & COMPANY, INC., New York, NY (US)

(*) Notice: Subject to any disclaimer, the term of this patent is extended or adjusted under 35 U.S.C. 154(b) by 0 days.

(21) Appl. No.: 18/171,134

(22) Filed: Feb. 17, 2023

(65) Prior Publication Data

US 2023/0267070 A1 Aug. 24, 2023

Related U.S. Application Data

(60) Provisional application No. 63/311,856, filed on Feb. 18, 2022.

(51) Int. Cl.
*G06F 11/36* (2006.01)

(52) U.S. Cl.
CPC ...... *G06F 11/3644* (2013.01); *G06F 11/3636* (2013.01)

(58) Field of Classification Search
CPC .................................................. G06F 11/3644
USPC ............................................................ 717/130
See application file for complete search history.

(56) References Cited

U.S. PATENT DOCUMENTS

| | | | | |
|---|---|---|---|---|
| 8,776,026 | B2* | 7/2014 | Candea | G06F 9/45516 717/126 |
| 8,856,753 | B2* | 10/2014 | Varadarajulu | G06F 11/3419 717/130 |
| 9,002,836 | B2* | 4/2015 | Shiralkar | H04L 41/50 707/723 |
| 9,311,061 | B2* | 4/2016 | Delia | G06F 9/5038 |
| 9,405,541 | B2* | 8/2016 | Bradbury | G06F 9/3005 |

(Continued)

FOREIGN PATENT DOCUMENTS

| | | | | |
|---|---|---|---|---|
| JP | 2018073405 | A * | 5/2018 | ............ G06F 11/362 |
| JP | 7092893 | B2 * | 6/2022 | ........... A63F 13/352 |

*Primary Examiner* — Francisco J Aponte
(74) *Attorney, Agent, or Firm* — Volpe Koenig (57) ABSTRACT

Systems and methods for adjusting operating parameters of at least one pipelined software asset. Within a pipelined environment, an agent software asset is inserted immediately preceding a software asset whose operating parameters are to be adjusted. The agent software asset receives data and/or data sets from a user and such data and data sets are inserted/used by the software asset. The agent software asset also allows for a reporting of the output of other software assets to thereby provide users with intermediate outputs from the pipelined environment.

18 Claims, 5 Drawing Sheets

(56) References Cited

U.S. PATENT DOCUMENTS

| | | | | |
|---|---|---|---|---|
| 9,465,606 | B2* | 10/2016 | Suresh | G06F 8/70 |
| 9,552,284 | B2* | 1/2017 | Copos | G06F 11/3636 |
| 9,703,687 | B2* | 7/2017 | Shani | G06F 8/65 |
| 10,198,507 | B2* | 2/2019 | Pawar | G06F 16/36 |
| 10,860,599 | B2* | 12/2020 | McCluskey | G06F 9/546 |
| 11,055,071 | B2* | 7/2021 | Oburu | G06Q 20/4016 |
| 11,288,061 | B1* | 3/2022 | Johnson | G06F 8/51 |
| 11,341,363 | B1* | 5/2022 | Zeiler | G06F 18/2185 |
| 11,347,500 | B2* | 5/2022 | Krishnamoorthy | G06N 3/08 |
| 11,573,775 | B2* | 2/2023 | Krishnamoorthy | G06F 8/72 |
| 11,599,342 | B2* | 3/2023 | Eigler | G06F 16/90335 |
| 2012/0167057 | A1* | 6/2012 | Schmich | G06F 11/3644 |
| | | | | 717/130 |
| 2014/0075502 | A1* | 3/2014 | Aissi | G06F 21/60 |
| | | | | 726/1 |
| 2017/0123960 | A1* | 5/2017 | Pechanec | G06F 11/3664 |
| 2019/0340103 | A1* | 11/2019 | Nelson | G06F 11/3636 |
| 2019/0344181 | A1* | 11/2019 | Ante | A63F 13/77 |
| 2020/0125956 | A1* | 4/2020 | Ravi | G06N 3/045 |
| 2020/0387818 | A1* | 12/2020 | Chan | G06F 17/18 |
| 2022/0012061 | A1* | 1/2022 | Pallister | G06F 9/3851 |
| 2022/0036232 | A1* | 2/2022 | Patel | G06F 8/60 |
| 2023/0144263 | A1* | 5/2023 | Nguyen | H04L 65/61 |
| | | | | 707/831 |

\* cited by examiner

ADJUSTMENT OF OPERATING PARAMETERS OF ARRANGED SOFTWARE ASSETS

CROSS REFERENCE TO RELATED APPLICATION

This application claims the benefit of and priority to U.S. Provisional Application No. 63/311,856, filed Feb. 18, 2022, entitled ADJUSTMENT OF OPERATING PARAMETERS OF ARRANGED SOFTWARE ASSETS, the contents of which are hereby incorporated by reference as if fully set forth herein.

TECHNICAL FIELD

The present invention relates to software. More specifically, the present invention relates to systems, methods, and devices for allowing the adjustment of parameters and functions of software assets prior to the execution of such software assets.

BACKGROUND

The explosion in interest in AI/machine learning systems in the past few years has also led to a corresponding increase in the complexity of the systems being used for such purposes. This explosion has also led to a simplification of systems—instead of large software projects, projects are now built upon smaller and smaller pieces of code that can be reused and chained together to result in larger machine learning/artificial intelligence projects. Such software assets are usually sequentially ordered and executed in a pipelined fashion with an output only being available after the software assets in the pipeline have been executed.

However, one issue with such an approach is that the paradigm does not allow for quick what-if simulations. Currently, projects need to be recompiled, re-run, and re-optimized when testing out a hypothesis. As can be imagined, this is a time and resource consuming process and may lead to insufficient testing of concepts and potential outcomes.

There is therefore a need for systems and methods that allow for more testing and for the ability to address the shortcomings noted above.

SUMMARY

The present invention provides systems and methods for adjusting operating parameters of at least one software asset. Within a software execution environment, an agent software asset is inserted immediately preceding a software asset whose operating parameters are to be adjusted. The agent software asset receives data and/or data sets from a user and such data and data sets are inserted/used by the software asset. The agent software asset also allows for a reporting of the output of other software assets to thereby provide users with intermediate outputs from the pipelined environment.

In a first aspect, the present invention provides a method for operating one or more software assets, the method comprising:

a) arranging said one or more software assets in a specific configuration such that said software assets are executed in a user defined arrangement, said specific configuration resulting in an arrangement having at least one output after all of said software assets are executed;

b) adjusting operating parameters of at least one of said software assets prior to execution of said software assets;

c) executing said software assets;

d) receiving outputs of at least one of: said software assets and said arrangement;

wherein said operating parameters includes at least one of: values for variables used when executing said software assets, additional variables to be added to said software assets prior to executing said software assets, at least one subroutine to be added to said software assets prior to executing said software assets.

In another aspect, the present invention provides computer readable media having encoded thereon computer-executable and computer-readable instructions that, when executed, implement a method for operating one or more software assets, the method comprising:

a) arranging said one or more software assets in a specific configuration such that said software assets are executed in a user defined arrangement, said specific configuration resulting in an arrangement having at least one output after all of said software assets are executed;

b) adjusting operating parameters of at least one of said software assets prior to execution of said software assets;

c) executing said software assets;

d) receiving outputs of at least one of: said software assets and said pipeline;

wherein said operating parameters includes at least one of: values for variables used when executing said software assets, additional variables to be added to said software assets prior to executing said software assets, at least one subroutine to be added to said software assets prior to executing said software assets.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In one aspect, the present invention uses software assets and allows for software assets to have their outputs reported and their inputs to be adjusted. It should be clear that the term "software assets" includes models, modules, code sections, code segments, code blocks, and other portions/sections of computer code that can be encapsulated into executable blocks. These software assets can be retrieved from a suitable repository, arranged for execution in a suitable arrangement, and then executed in an order dictated by the arrangement to produce an arrangement output. In other words, software assets are modularized and can be downloaded/retrieved and then used in a suitable project.

It should be clear that each software asset can be encapsulated in its own compartment with suitable resources to be executed. In one aspect, the software assets can be chained together in a pipeline such that one software asset's output becomes the immediately succeeding software asset's input. In another aspect, the software assets can be arranged in a parallel arrangement such that multiple software assets are executed in parallel with one another. Alternatively, multiple software assets can be pipelined in one pipeline and multiple pipelines can be executing in parallel with each other. For other implementations, software assets that stem from a common origin and which do not have data dependencies with one another can be arranged/configured such that the software assets are executed in parallel.

It should be noted that, while this document refers to "pipelining" software assets or arranging software assets for sequential execution, the concepts and implementations detailed in this description may also apply to software assets that are arranged in parallel as should be clear to a person of skill in the software engineering/computer software arts.

It should be clear that such tight pipelining prevents users from adjusting a software asset's inputs (for what-if testing) and it can even prevent the review of a software asset's outputs. Reviewing such intermediate outputs from software assets, in conjunction with reviewing the pipeline's eventual output, can provide insights into how the pipelined overall process is behaving or operating. The ability to adjust the inputs to one or more of the pipelined software assets can also provide invaluable insight and knowledge into how the data affects the overall process and how the process results in the pipeline output.

In one aspect of the present invention, this ability to adjust the inputs to a software asset may also allow for the reporting of a software asset's outputs. Preferably, a software asset's outputs can be monitored without requiring an arranged sequence's ultimate output (e.g, a pipelined sequence of software assets or a parallelized group of software assets). Also preferably, adjusting a software asset's inputs also allows for a more expansive adjustment of a software asset's operating parameters. Adjusting a software asset's parameters can allow for the exploration of multiple what-if scenarios, extended testing of a software asset's functionality, extended testing of a software asset's resilience to bad data, as well as testing of possible variants of a software asset's functions.

It should be clear that adjusting a software asset's operating parameters may include one or more of the following: increasing or decreasing one or more values of variables used by the software asset, increasing or decreasing one or more values of the software asset's outputs, adding (or removing) one or more variables that may be used by the software asset when the software asset is executed, assigning specific values (whether fixed or relative) to one or more variables that is an input or an output of the software asset, otherwise adjusting the data or the logic used by the software asset.

One option for adjusting a software asset's operating parameters is to insert an agent software asset either before or after a specific software asset. This agent software asset has the function of receiving any incoming data and can adjust such incoming data prior to passing the adjusted data to the next software asset in the sequence in the pipeline (if the software asset is pipelined). The agent software asset may also receive data for insertion into the next software asset in the sequence—the received data can be used to set specific values for variables, increase or decrease values for variables, add variables to be used by the next software asset, and even negate the effect of one or more variables or subroutines in the software asset. In addition, the agent software asset may be used so report/output the output of the preceding software asset in the sequence.

To explain the above, an agent software asset may be inserted between software asset A and software asset B in the pipeline, with software asset A being configured to be executed prior to (or in parallel with) executing software asset B. The agent software asset receives the output of software asset A and may adjust the values of this output prior to passing the adjusted values to software asset B for use in its internal logic. As well, the agent software asset may also be configured to output what is received from software asset A as an intermediate output from the pipeline, thereby allowing a user to monitor the internal values being generated by the pipeline. Thus, an agent software asset may interact with the output of an immediately preceding software asset to adjust, output, or perform logic on the output. As well, the agent software asset may interact with the input to the immediately succeeding software asset to set or otherwise adjust these inputs. It should be clear that the data that an agent software asset passes to an immediately succeeding software asset does not have to be related to or be derived from the output of an immediately preceding software asset. The data passed from the agent software asset to the immediately succeeding software asset may be completely new and may all come from user input or from user created or user inserted data sets. The agent software asset may thus be used to completely negate the effect of an immediately preceding software asset.

As an alternative to the above, instead of inserting an agent software asset between pipelined software assets, each software asset to be pipelined may be repackaged or re-encapsulated. The repackaging may be performed to insert suitable subroutines that allow for user inserted data or user controlled actions regarding the data produced by the software asset. The subroutines may be inserted in the end or the final stages of the software asset such that any output of the software asset can be suitably adjusted as desired. In addition to such an adjustment, the output can be reported out even while the software asset is pipelined.

To explain the alternative above, if software asset A is pipelined as being immediately preceding software asset B, software asset A may be repackaged to insert suitable subroutines in the software asset's final stages. Once pipelined together, any output from the repackaged software asset A is passed on to software asset B as software asset B's input. Since the newly inserted subroutines in software asset A allows for user control/user controlled insertions over software asset A's output (and hence over software asset B's input), this alternative provides users with ability to adjust software asset B's operating parameters. In sum, by inserting suitable logic that gives a user control over a software asset's output, once that software asset has been pipelined with a subsequent software asset, the suitable logic effective gives a user control over the input to that subsequent software asset.

In another variant of the present invention, if a specific software asset is present in multiple pipelines, suitably configuring those pipelines will provide one with the capability to adjust the operations parameters for all instances of that specific software asset across those multiple pipelines. Thus, regardless of where in each pipeline the specific software asset is, the inputs, variables, and functions of that specific software asset, in all the pipelines, can be uniformly adjusted in one step. This can be implemented by having that specific software asset be associated with an agent software asset such that pipelining that specific software asset (regardless of where in a pipeline that specific software asset ends up) will cause the installation of an agent software asset to immediately precede that specific software asset in the pipeline. Tracking the location of the specific software asset in the different pipelines may be accomplished by using a registry and, if desired, pointers that point specifically to the agent software asset may also be used. The pointers can then be used to insert/send data/data sets to the agent software assets for insertion/use by the specific software asset.

In the above variant, by tracking the location of the specific software asset across the different pipelines, the operating parameters for all these instances of the specific software asset can all be adjusted identically and simultaneously. Since the agent software asset is identical in all the instances of the specific software asset, sending data and/or data sets and/or adjustments to the agent software asset would cause the exact same effects to each instance of the agent software asset. This ensures that the effect on the specific software asset, across all its instances in the various pipelines, would be identical. As noted before, the locations and instances of the specific software asset across multiple pipelines can be tracked by using a registry and/or pointers to each instance.

It should be clear that the above measures may also be applied to software assets that are arranged to be executed in parallel. That is, the location of a software asset can be tracked, whether that software asset is in a pipelined arrangement or in a parallel arrangement, and the agent software asset can be inserted immediately prior to or immediately subsequent to that software asset.

Figure 1A:
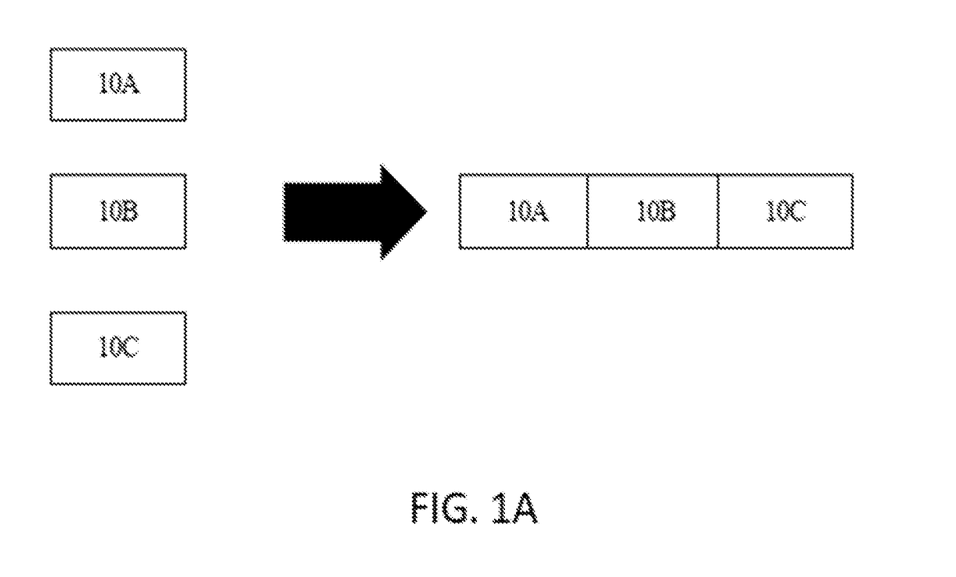
FIG. 1A is a schematic block diagram illustrating pipelining software assets.

Referring to FIG. 1A, a block diagram schematically partially illustrating one concept of the present invention is provided. As can be seen on the left of the Figure, encapsulated or modularized software assets 10A, 10B, 10C are to be pipelined for sequential execution. The figure on the right shows these software assets as pipelined for sequential execution.

Figure 1B:
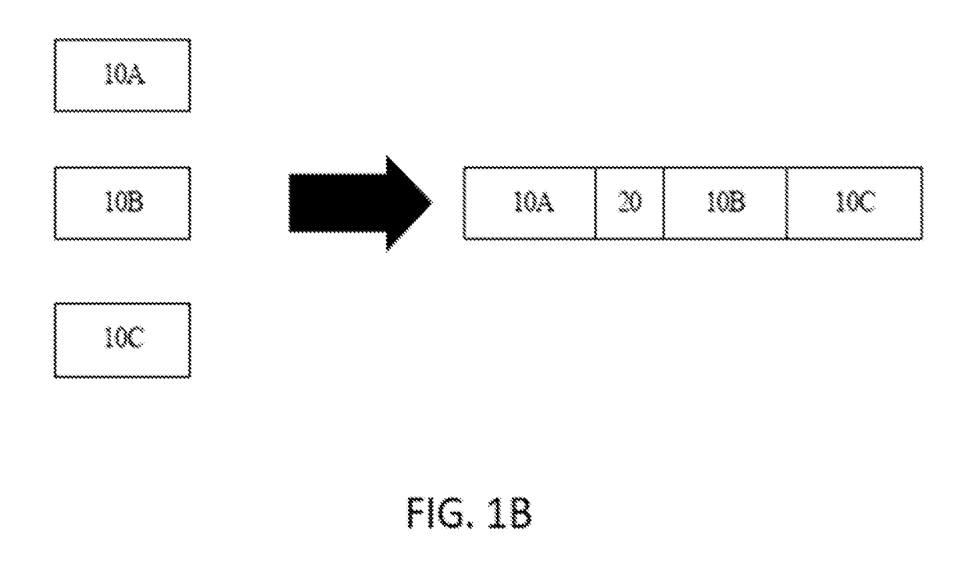
FIG. 1B illustrates one aspect of the present invention that uses agent software assets.

In FIG. 1B, an agent software asset is inserted to allow for the adjustment of operating parameters for software asset 10B and for the reporting of the output of software asset 10A. As can be seen in the Figure, the agent software asset 20 is inserted between software asset 10A and software asset 10B in the pipeline. Output data from software asset 10A can then be retrieved and input data and input data sets can be inserted for software asset 10B.

Figure 1C:
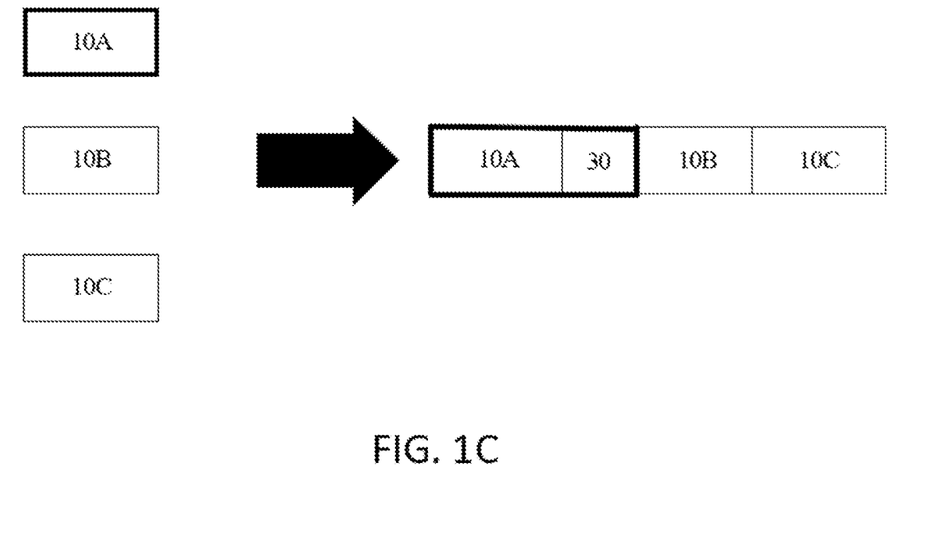
FIG. 1C illustrates another aspect of the present invention that uses adjusted software assets instead of agent software assets.

In FIG. 1C, a variant of the present invention uses the insertion of subroutines and code into an encapsulated or modularized software asset. As can be seen, software assets 10A-10C are to be pipelined. However, to be able to insert data into software asset 10B, then the immediately preceding software asset in the eventual pipeline, software asset 10A, has to be adjusted/amended. In the right side of the figure, the pipelined software assets are schematically illustrated. As can be seen, as part of software asset 10A, software section 30 has been inserted. This software section 30 performs the same function as agent software asset 20 in that it allows for the reporting of output from software asset 10A and for the insertion/adjustment of operating parameters for software asset 10B.

Figure 1D:
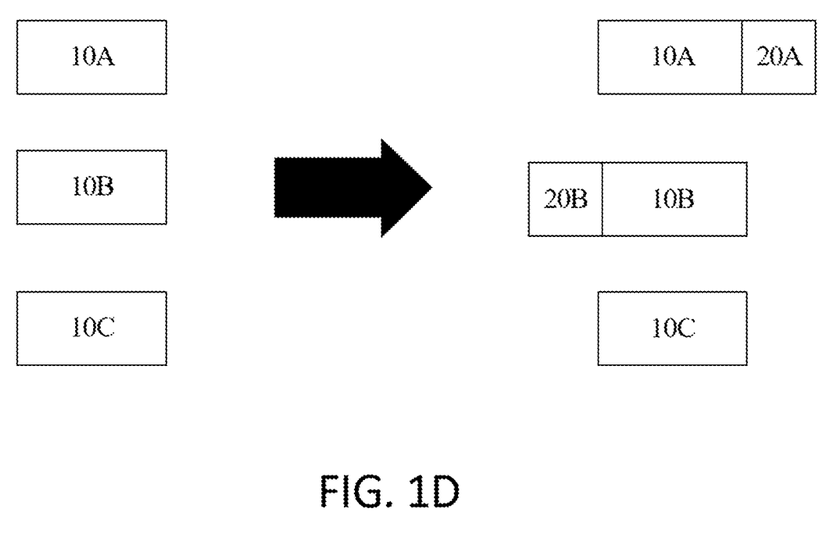
FIG. 1D illustrates one aspect of the present invention that uses agent software assets for software assets arranged in a parallel arrangement.

In FIG. 1D, software assets 10A-10C are to be arranged for parallel execution. To allow for the adjustment of operating parameters for software asset 10B and for the reporting of the output of software asset 10A, as in FIG. 1B, agent software asset 20A is inserted right after software asset 10A. As well, agent software asset 20B is inserted just prior to software asset 10B. Output data from software asset 10A can then be retrieved and input data and input data sets can be inserted for software asset 10B.

It should be clear that the various aspects of the invention may be practiced on many data processing systems. In one implementation, the invention may be practiced on a system for managing software resources such as machine learning models, AI based software modules, sections of code, and data sets used in training/creating the AI modules. Such a system may operate to ensure that any code generated by a user is properly documented and that versions of the code and its documentation are properly stored for potential reuse. Such a system may operate such that the data used to generate models are also properly documented, versioned, saved, and linked to the relevant models. Thus, data sets that were used to create/engineer/validate specific models are linked with their associated models along with any relevant documentation, thereby ensuring accountability and traceability for anyone wishing to use/adjust either the models or the data.

It should be clear that the various aspects of the present invention may be used with any number of models in any number of model domains. Such aspects of the present invention are not limited to machine learning/artificial intelligence models/projects but can also be used/applied to other target models such as machine learning/artificial intelligence models, statistical/regression models, or quantitative models in general. The present invention may thus be used for software assets that are used in different model domains including credit risk, market risk, machine learning/artificial intelligence, non-financial risk models, etc. The present invention may also be used by those involved in the various stages of a model life cycle and not just by model developers in model development. Thus, the present invention may be used by validators, model owners, those who maintain and monitor models, and others who are involved in the entire model life cycle.

Figure 2:
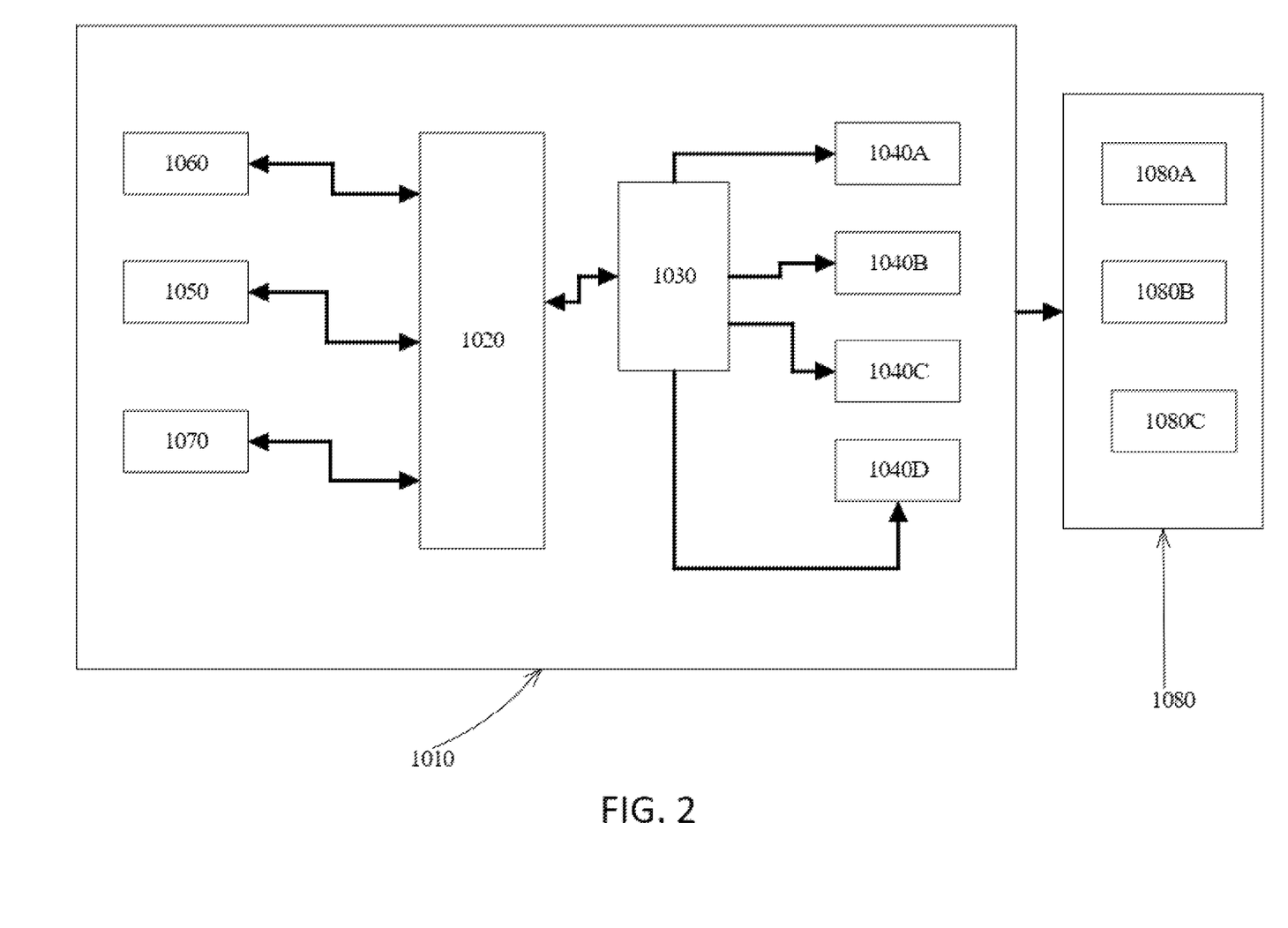
FIG. 2 is a block diagram of an environment for implementing one aspect of the present invention.

Referring to FIG. 2, a block diagram of the system where the invention may be practiced is illustrated. As can be seen, the system 1010 includes a UI (user interface) element 1020, an assessment element 1030, a number of execution units 1040A-1040D in parallel, as well as a data versioning component 1050, a resource versioning component 1060, and a data storage component 1070. The outputs of the various parts of the system are sent to a data output module 1080.

In operation, a user, by way of the UI element 1020, creates a project for execution by one of the execution units 1040A-1040D. The user can select multiple software assets that can be executed. These software assets are stored using the data storage component 1070 and are retrieved using the same component. Documentation for the selected software assets can also be retrieved from suitable storage media using the same data storage component. The user can then rearrange the selected software assets or can write/train his or her own software assets as necessary. Once software assets have been selected or compiled, the project is assessed by the assessment element 1030. This assessment element 1030 ensures that the project conforms to predefined and precoded software development practices and norms. Thus, in one aspect, the user is prompted and queried to provide suitable documentation for the various stages of the project. The documentation and the code generated by the project (regardless of whether the resulting code is a conglomeration of pre-existing software assets or is a newly written segment of code or a mix of the two) is stored and versioned as necessary by the resource versioning component 60 and by the data storage component 1070. At suitable stages of development of the project, the resource versioning component 1060 can, either automatically or manually (depending on the configuration of the system), produce versions of the project and/or of any code being written/compiled, along with any suitable documentation. Should the project and/or any software asset that the project uses require training using one or more specific sets of data, these specific sets of data are tagged with specific version numbers and are associated with the specific version of the project and/or code as necessary. The versioning of the data is handled by the data versioning component 1050.

In addition to ensuring that the various software assets used in a project conform to suitable software development practices, the assessment element 1030 also checks to ensure that the various software assets are suitably compatible with one another. As an example, if there is a data type mismatch between one software asset's outputs and an immediately subsequent software asset's inputs, such a mismatch would be flagged to the user and the project would be placed on hold until the user has addressed the issue.

It should also be clear that the assessment element 1030 may comprise multiple elements or sub-elements that perform multiple assessment functions. The one or more assessment elements 1030 (and/or assessment sub-elements) are used to perform qualitative and/or quantitative assessments of the various software assets involved in the system. The assessment elements 1030 perform quantitative assessments by way of a series of statistical tests, sensitivity analysis, bias detection algorithms, etc. Qualitative assessments are, in one implementation, performed by way of expert assessment along multi-dimensional assessment questionnaires and scoring sheets. The sub-components of the assessment element 30 provides access to codified test repositories for quantified testing as well as codified qualitative assessment standards for different model domains (e.g., credit risk, market risk, machine learning/artificial intelligence, non-financial risk models, etc.). These assessments can be performed automatically or, depending on the implementation, launched manually by a user.

Regarding the data output module 1080, the module may be implemented as having three major components—a front end 1080A, a back end 1080B, and a database 1080C. As can be imagined, the outputs received from the various execution units of the system are received by the back end and are stored in the database. These outputs are used to populate preconfigured reports that are then delivered to the user by way of the front end. Of course, the outputs from the execution units are tagged with relevant information when sent to the data output module including which software asset(s) were used in producing the output (with links to the software assets), which data sets were used (and the output is linked to the data set as stored), indications whether the output is an intermediate output or a final output, the user running the project, an identification of the project (as well as links to the documentation for the project as well as to the project itself as stored), the version of the project, the versions of the software assets used in producing the output, as well as other relevant data points for the output. Other data may also be output from the execution units such as user defined model/software asset metadata, metrics for the software assets, thresholds, and version information. This data and the output itself are stored in the database and are associated/linked to the software assets and to the project. As noted above, the output data is then used to populate predefined and preconfigured templates to produce reports for the user.

As an alternative, the data output module 1080 may store the outputs, whether intermediate or final, from the project in the database. These outputs can then be analyzed as telemetry from project as the various software assets are executed. The analysis may, of course, be performed post execution or while the software assets are running.

It should be clear that the execution units 1040A-1040D contain the pipelined software assets and that these pipelined software assets are sequentially executed by the execution units, with each execution unit handling one pipeline as necessary. The pipelined software assets in FIGS. 1A-1C may be contained and executed in any one of execution units 1040A-1040D. Of course, a parallel arrangement of software assets for parallel execution of such assets is possible, if desired.

Figure 3:
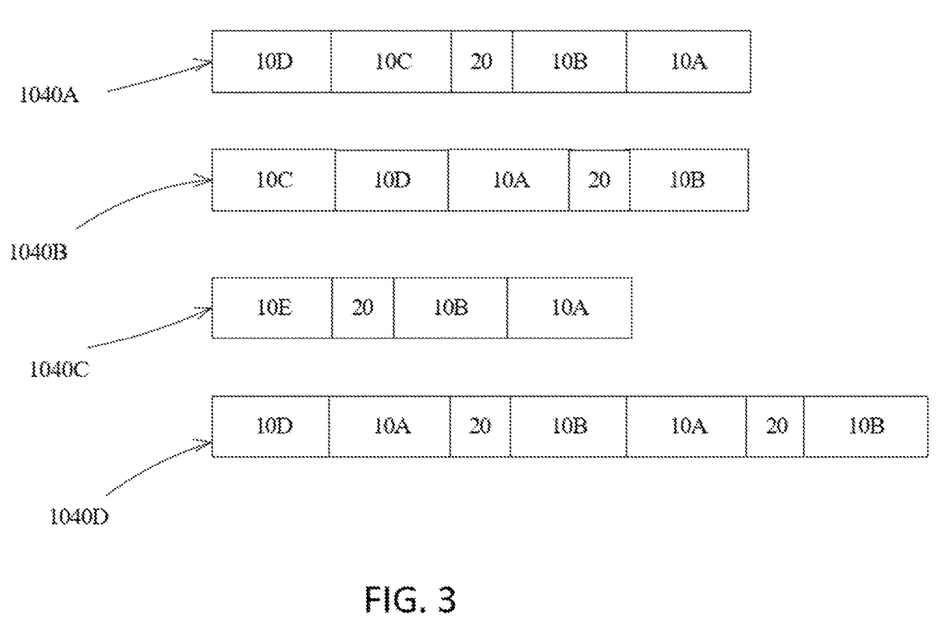
FIG. 3 is a block diagram illustrating an example of multiple execution units with different pipelined software assets.

In one example of the variant noted above for the present invention, FIG. 3 shows the execution units 1040A-1040D as agent software assets 20 are deployed to adjust the operation parameters for software asset 10B. As can be seen in FIG. 3, the different pipelines 1040A-1040D each have different software assets for execution in different sequences. However, to ensure that the operations parameters for software asset 10B are adjustable, agent software asset 20 is deployed immediately preceding each instance of software asset 10B in the various pipelines. As can be seen, execution unit 1040D has two instances of software asset 10B and, as such, there are two instances of agent software asset 20 in the pipeline. Also, in accordance with the description above, the use of the agent software asset 20 in the various positions in the various pipelines allows for the output of the immediately preceding software asset to be reported to the user.

For clarity, the agent software asset 20 can be configured to send the output from the immediately preceding software asset to the data output module 1080. The immediately preceding software asset, for execution unit 1040A, would be software asset 10C. For execution unit 1040B, the reporting software asset would be software asset 10A. For execution unit 1040C, the reporting software asset would be software asset 10E. For execution unit 1040D, the reporting software assets would be software assets 10A in different places in the pipeline. These two software assets 10A, since they are in different positions in the pipeline, may produce different outputs. Once the outputs have been received, the data output module 1080 can then store the intermediate outputs of the various relevant software assets from the pipelines and report these to the user using templates as explained above.

It should be clear that the configuration in FIG. 3 uses multiple execution units with multiple different software assets in different pipelined configurations being executed in parallel. However, it is also possible for the multiple execution units to each have the same sequence of software assets for each pipelined execution units but with different software assets being fed different data/data sets. This allows for multiple simultaneous experiments to be executed in parallel with the same assets but with different data for different assets.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for operating software assets, the method comprising:

(a) arranging said software assets in a specific configuration, said specific configuration comprising a user-defined sequential arrangement for said software assets;
(b) adjusting operating parameters of at least one of said software assets;
(c) executing said software assets in a sequence according to said sequential arrangement, said sequence resulting in at least one output;
(d) receiving outputs of at least one of: said software assets and said sequence;
wherein said operating parameters include at least one of:
  values for variables used in step (c),
  additional variables to be added to said software assets prior to step (c), and
  at least one subroutine to be added to said software assets prior to step (c);
execution of step (b) for a specific one of said software assets in said user-defined sequential arrangement causes an adjustment of corresponding operating parameters for at least one corresponding instance of said specific one of said software assets in at least one other sequential arrangement different from said user-defined sequential arrangement;
step (c) is executed in parallel with said at least one other sequential arrangement; and
said method includes:
  maintaining a registry that tracks locations of said software assets used in said user-defined sequential arrangement and that tracks locations of corresponding instances of said software assets in said at least one other sequential arrangement.

2. The method according to claim 1, further comprising inserting an agent software asset between a first software asset and a second software asset in said user-defined sequential arrangement, said agent software asset being for use in adjusting operating parameters of at least one of said software assets.

3. The method according to claim 2, wherein said agent software asset reports outputs from said first software asset in said user-defined sequential arrangement.

4. The method according to claim 2, wherein said agent software asset adjusts said operating parameters for said second software asset.

5. The method according to claim 2, wherein said agent software asset adjusts inputs to be fed into said second software asset in said user-defined sequential arrangement.

6. The method according to claim 5, wherein said agent software asset adjusts said inputs based on user input.

7. The method according to claim 2, wherein said agent software asset inserts additional variables into said second software asset.

8. The method according to claim 1, wherein, based on locations of said specific software assets, agent software assets are inserted in at least one other sequential arrangement to thereby allow for said adjustment of said corresponding operating parameters.

9. The method according to claim 1, wherein, prior to step (b), at least one software asset is modified to include at least one subroutine for adjusting outputs of said at least one software asset.

10. The method according to claim 1, wherein, prior to step (b), at least one software asset is modified to include at least one subroutine for reporting outputs of said at least one software asset to a user.

11. The method according to claim 1, wherein, prior to step (b), at least one software asset is modified to include at least one subroutine for adjusting inputs of said at least one software asset.

12. The method according to claim 1, wherein, prior to step (b), at least one software asset is modified to include at least one subroutine for adjusting said operating parameters of said at least one software asset.

13. The method according to claim 12, wherein a modification of said at least one software asset is part of a process for arranging said software assets in said specific configuration.

14. The method according to claim 12, wherein said operating parameters are adjusted based on user input.

15. The method according to claim 12, wherein said operating parameters are adjusted based on a preconfigured user input.

16. The method according to claim 1, wherein said user-defined sequential arrangement comprises a pipelined configuration.

17. The method according to claim 1, wherein said user-defined sequential arrangement comprises a parallel configuration.

18. Non-transitory computer readable media having encoded thereon computer-executable and computer-readable instructions that, when executed, implement a method for operating one or more software assets, the method comprising:
  (a) arranging said software assets in a specific configuration, said specific configuration comprising in a user-defined sequential arrangement for said software assets;
  (b) adjusting operating parameters of at least one of said software assets;
  (c) executing said software assets in a sequence according to said sequential arrangement, said sequence resulting in at least one output;
  (d) receiving outputs of at least one of: said software assets and said sequence;
  wherein said operating parameters include at least one of:
    values for variables used in step (c),
    additional variables to be added to said software assets prior to step (c), and
    at least one subroutine to be added to said software assets prior to step (c);
  execution of step (b) for a specific one of said software assets in said user-defined sequential arrangement causes an adjustment of corresponding operating parameters for at least one corresponding instance of said specific one of said software assets in at least one other sequential arrangement different from said user-defined sequential arrangement;
  step (c) is executed in parallel with said at least one other sequential arrangement; and
  said method includes:
    maintaining a registry that tracks locations of said software assets used in said user-defined sequential arrangement and that tracks locations of corresponding instances of said software assets in said at least one other sequential arrangement.

* * * * *